US008803839B2

(12) United States Patent  
Brosnan et al.

(10) Patent No.: US 8,803,839 B2  
(45) Date of Patent: Aug. 12, 2014

(54) CAPACITIVE COUPLING OF A CAPACITIVE TOUCHSCREEN TO A PRINTED CIRCUIT AND CONTROLLER

(75) Inventors: Michael John Brosnan, Fremont, CA (US); Robert Ritter, Los Gatos, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 597 days.

(21) Appl. No.: 12/916,571

(22) Filed: Oct. 31, 2010

(65) Prior Publication Data

US 2012/0105356 A1     May 3, 2012

(51) Int. Cl.
  *G06F 3/045*       (2006.01)
  *H05K 13/00*       (2006.01)
  *G06F 3/044*       (2006.01)
(52) U.S. Cl.
  CPC ...................................... *G06F 3/044* (2013.01)
  USPC ............................................ 345/174; 29/854
(58) Field of Classification Search
  None
  See application file for complete search history.

(56) References Cited

U.S. PATENT DOCUMENTS

| | | | |
|---|---|---|---|
| 7,030,513 B2 | 4/2006 | Caldwell | |
| 7,208,835 B2 | 4/2007 | Tsou et al. | |
| 7,547,214 B2 | 6/2009 | Duesterhoef et al. | |
| 2008/0062139 A1* | 3/2008 | Hotelling et al. | 345/173 |
| 2008/0309623 A1* | 12/2008 | Hotelling et al. | 345/173 |
| 2009/0135157 A1* | 5/2009 | Harley | 345/174 |
| 2009/0201267 A1 | 8/2009 | Akimoto et al. | |
| 2009/0295740 A1 | 12/2009 | Lee | |
| 2010/0149108 A1* | 6/2010 | Hotelling et al. | 345/173 |
| 2010/0321326 A1* | 12/2010 | Grunthaner et al. | 345/174 |

* cited by examiner

*Primary Examiner* — Joe H Cheng  
*Assistant Examiner* — Yaron Cohen  
(74) *Attorney, Agent, or Firm* — Winston Hsu; Scott Margo

(57) ABSTRACT

Disclosed herein are various embodiments of circuits and methods for capacitively coupling touchscreen electrode terminals to terminals of a flex circuit, printed circuit or printed circuit board, without physically attaching the touchscreen electrode terminals to the flex circuit, printed circuit or printed circuit board terminals by means of conventional electrical connection bonding materials or agents such as anisotropic conductive film or solder. The flex circuit, printed circuit or printed circuit board terminals are spaced apart from, or placed in physical contact with, corresponding ones of the touchscreen electrode terminals, but are not soldered or otherwise physically attached to the touchscreen electrode terminals by conventional electrical connection bonding materials or agents such as anisotropic conductive film or solder. The flex circuit, printed circuit or printed circuit board terminals are positioned with respect to the touchscreen electrode terminals such that the flex circuit, printed circuit or printed circuit board terminals are spaced part from, or in physical contact with, the touchscreen electrode terminals by gaps ranging between about 0.0 mm and about 1 mm. The gaps are sufficiently small to permit capacitive coupling of drive and sense signals provided by the touchscreen electrode terminals to the flex circuit, printed circuit or printed circuit board terminals.

34 Claims, 12 Drawing Sheets

CAPACITIVE COUPLING OF A CAPACITIVE TOUCHSCREEN TO A PRINTED CIRCUIT AND CONTROLLER

FIELD OF THE INVENTION

Various embodiments of the invention described herein relate to the field of capacitive sensing input devices generally, and more specifically to means and methods for establishing capacitive coupling between a capacitive touchscreen and a controller.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage ($Q=CV$). Self-capacitance is typically measured by applying a known voltage to an electrode, and then using a circuit to measure how much charge flows to that same electrode. When external objects are brought close to the electrode, the electric fields projecting from the electrodes are altered. As a result, the self-capacitance of the electrode increases. Many touch sensors are configured such that the external object is a finger. The human body is essentially a capacitor to earth where the electric field vanishes, and typically has a capacitance of around 100 pF.

Electrodes in self-capacitance touchpads are typically arranged in rows and columns. By scanning first rows and then columns the locations of individual disturbances induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE.™ In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of m×n intersections with only m+n pins on an IC.

Establishing electrical connections between a capacitive touchscreen and its associated touchscreen controller typically requires the use of flex circuits, which are soldered at either end to appropriate terminals, or that are electrically connected to appropriate terminals with anisotropic conductive film (more about which is said below). Such means of establishing electrical connections usually require precise alignment of the various contacts and terminals, thereby increasing manufacturing costs. Moreover, the quality of such soldered and solid electrical connections typically must be monitored carefully during manufacturing, and later during use can break or weaken due to shock or repeated loading.

What is needed are devices and methods for providing electrical connections between a capacitive touchscreen and a touchscreen controller that do not require precise alignment during manufacturing, and that during use are less susceptible to failure.

SUMMARY

In one embodiment, there is provided a capacitive touchscreen system comprising a capacitive touchscreen comprising drive and sense touchscreen electrodes operably connected at one end to corresponding touchscreen electrode terminals, mutual capacitances existing between the drive and sense electrodes at locations where the drive and sense electrodes intersect, such mutual capacitances changing in the presence of one or more fingers or touch devices brought into proximity thereto, a touchscreen controller comprising controller terminals, the controller being configured to provide drive signals and to receive sense signals through the controller terminals, and a flex circuit comprising a plurality of flex circuit traces disposed between a first end and a second end thereof, the first end comprising first terminals corresponding to each of the flex circuit traces, the first terminals being operably connected to corresponding ones of the controller terminals, the second end comprising second terminals corresponding to each of the flex circuit traces, wherein the second terminals are spaced apart from, or in physical contact with, corresponding ones of the touchscreen electrode terminals, the second terminals are not soldered or otherwise physically attached to the touchscreen electrode terminals by means of an electrically conductive bonding agent or material, the second terminals are spaced apart from, or in physical contact with, the touchscreen electrode terminals by gaps ranging between about 0.0 mm and about 1 mm, and the gaps are sufficiently small to permit capacitive coupling of drive and sense signals provided by the touchscreen electrode terminals to the second terminals.

In another embodiment, there is provided a capacitive touchscreen system comprising a capacitive touchscreen comprising drive and sense touchscreen electrodes operably connected at one end to corresponding touchscreen electrode terminals, mutual capacitances existing between the drive and sense electrodes at locations where the drive and sense electrodes intersect, such mutual capacitances changing in the presence of one or more fingers or touch devices brought into proximity thereto, a touchscreen controller comprising controller terminals, the controller being configured to provide drive signals and to receive sense signals through the controller terminals, a printed circuit comprising printed circuit traces operably connected at one end to corresponding ones of the controller terminals and at the other end to printed circuit terminals, wherein the touchscreen controller is mounted on the printed circuit, the printed circuit terminals are spaced apart from, or in physical contact with, corresponding ones of the touchscreen electrode terminals, the printed circuit terminals are not soldered or otherwise physically attached to the touchscreen electrode terminals by means of an electrically conductive bonding agent or material, the printed circuit terminals are spaced apart from, or in physical contact with, the touchscreen electrode terminals by gaps ranging between about 0.0 mm and about 1 mm, and the gaps are sufficiently small to permit capacitive coupling of drive and sense signals provided by the touchscreen electrode terminals to the printed circuit terminals.

In yet another embodiment, there is provided a method of capacitively coupling touchscreen electrode terminals to terminals of a flex circuit without physically attaching the touchscreen electrode terminals to the flex circuit terminals, the method comprising spacing the flex circuit terminals apart from, or placing the flex circuit terminals in physical contact with, corresponding ones of the touchscreen electrode terminals, not soldering or otherwise physically attaching the flex circuit terminals to the touchscreen electrode terminals by means of an electrically conductive bonding agent or material, and positioning the flex circuit terminals with respect to the touchscreen electrode terminals such that the flex circuit terminals are spaced apart from, or in physical contact with, the touchscreen electrode terminals by gaps ranging between about 0.0 mm and about 1 mm, the gaps being sufficiently small to permit capacitive coupling of drive and sense signals provided by the touchscreen electrode terminals to the flex circuit terminals.

In still another embodiment, there is provided a method of capacitively coupling touchscreen electrode terminals to terminals of a printed circuit without physically attaching the touchscreen electrode terminals to the printed circuit terminals, the method comprising spacing the printed circuit terminals apart from, or placing the printed circuit terminals in physical contact with, corresponding ones of the touchscreen electrode terminals, not soldering or otherwise physically attaching the printed circuit terminals to the touchscreen electrode terminals by means of an electrically conductive bonding agent or material, and positioning the printed circuit terminals with respect to the touchscreen electrode terminals such that the printed circuit terminals are spaced apart from, or in physical contact with, the touchscreen electrode terminals by gaps ranging between about 0.0 mm and about 1 mm, the gaps being sufficiently small to permit capacitive coupling of drive and sense signals provided by the touchscreen electrode terminals to the printed circuit terminals.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
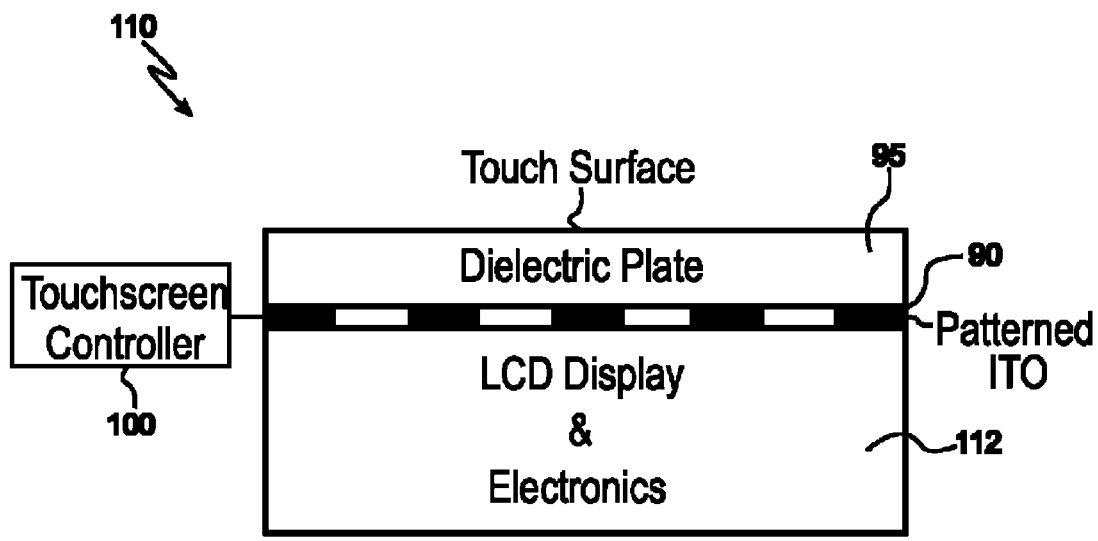
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
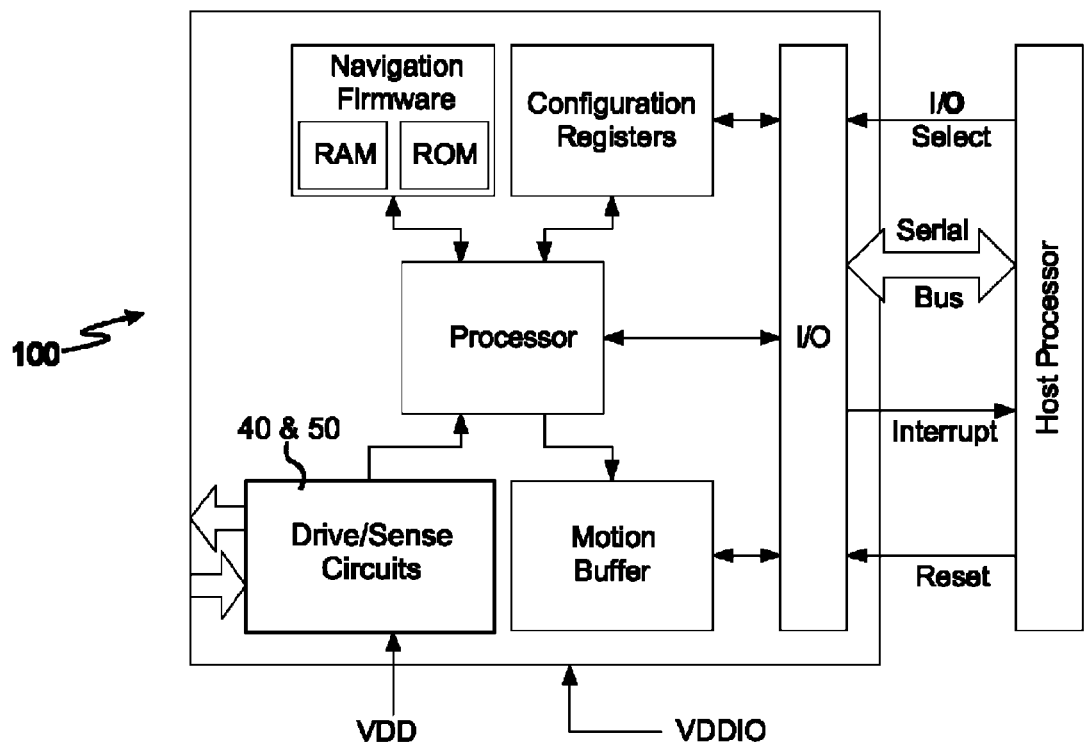
FIG. 2 shows a block diagram of a capacitive touchscreen controller.

FIG. 2 shows a block diagram of one embodiment of a touchscreen controller 100: In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
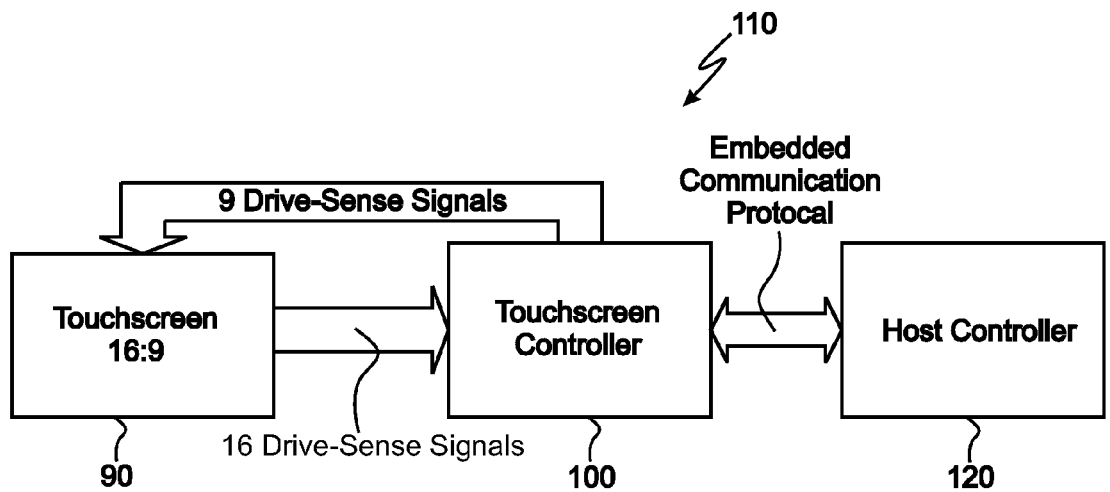
FIG. 3 shows one embodiment of a block diagram of a capacitive touchscreen system and a host controller.
Figure 4:
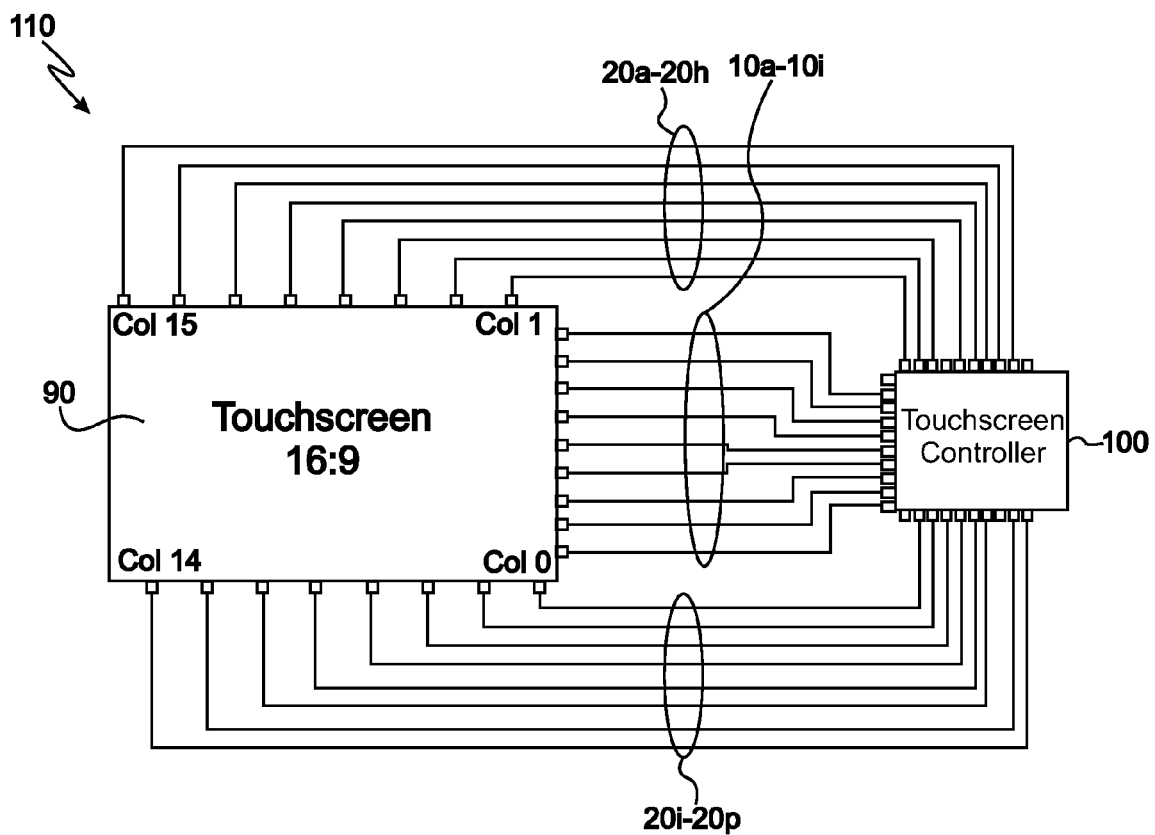
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 9 sense (or drive) and 16 drive (or sense) signal lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance: Touching panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 can feature multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 may automatically shift to the next-lowest power consumption mode. However, as power consumption is reduced the response time to touches typically increases.

According to one embodiment, and as shown in FIG. 4, an ITO grid on the touchscreen 90 comprises rows 20a-20p (or Y lines 1-16) and columns 10a-10i (or X lines 1-9), where rows 20a-20p are operably connected to drive circuits 40 and columns 10a-10i are operably connected to sense circuits 50. One configuration for routing ITO drive and sense lines to touchscreen controller 100 is shown in FIG. 4.

Note that the rows in a touchscreen may be configured to operate as sense lines, and the columns in a touchscreen may be configured to operate as drive lines. Drive lines may also be selectably switched to operate as sense lines, and sense lines may be selectably switched to operate as drive lines under the control of appropriate multiplexing and control circuitry. Moreover, drive and sense lines may be configured in patterns other than rows and columns, or other than orthogonal rows and columns. Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

In one embodiment, the angle between traces 10 and 20 is about 90 degrees (as shown, for example in FIG. 4), but may be any suitable angle such as, by way of example, about 15 degrees, about 30 degrees, about 45 degrees, about 60 degrees, or about 75 degrees. Electrically conductive traces 10 and 20 may be disposed in substantially parallel but vertically-offset first and second planes, respectively, or may be disposed in substantially the same plane. In one embodiment, electrically conductive traces 10 and 20 comprise indium tin oxide ("ITO"), or any other suitable electrically conductive material. A liquid crystal display may be disposed beneath electrically conductive traces 10 and 20, or any other suitable image display. Electrically conductive traces 10 and 20 are preferably disposed on a substrate comprising an electrically insulative material that is substantially optically transparent.

Note that touchscreen system 110 may be incorporated into or form a portion of an LCD, a computer display, a computer, a laptop computer, a notebook computer, an electronic book reader, a personal data assistant (PDA), a mobile telephone, a smart phone, an electronic book reader, a radio, an MP3 player, a portable music player, a stationary device, a television, a stereo, an exercise machine, an industrial control, a control panel, an outdoor control device, a household appliance, or any other suitable electronic device.

Figure 5:
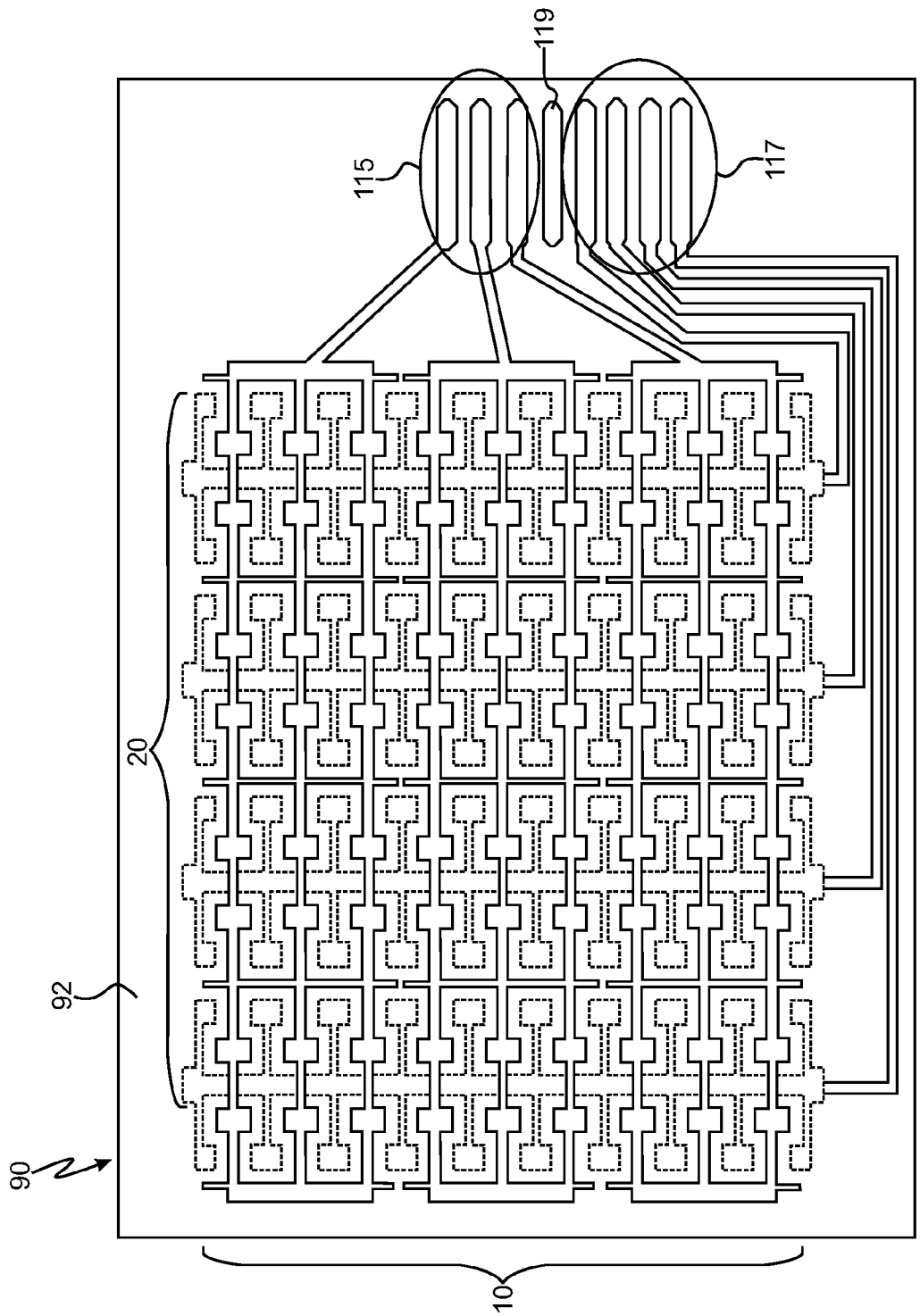
FIG. 5 shows a top view of a prior art touchscreen.

Referring now to FIG. 5, there is shown a touchscreen 90 of the prior art, which is formed on a substrate 92 (which may be glass, plastic and/or a printed circuit board or PCB). Touchscreen 90 includes drive electrodes 20 (described above) and sense electrodes 10 (also described above). Drive electrodes 20 and sense electrodes 10 typically form substantially optically transparent electrodes, usually formed of indium tin oxide, (or ITO) and are arranged in rows and columns in two layers that are electrically insulated from one another. Metal traces connect the drive and sense electrodes to a group of metal terminals or pads 115 and 117 disposed along an edge of touchscreen 90. Ground trace 119 is disposed between sense terminals or pads 115 and drive terminals or pads 117, and serves to reduce undesired mutual capacitances between terminals 115 and 117.

Figure 6:
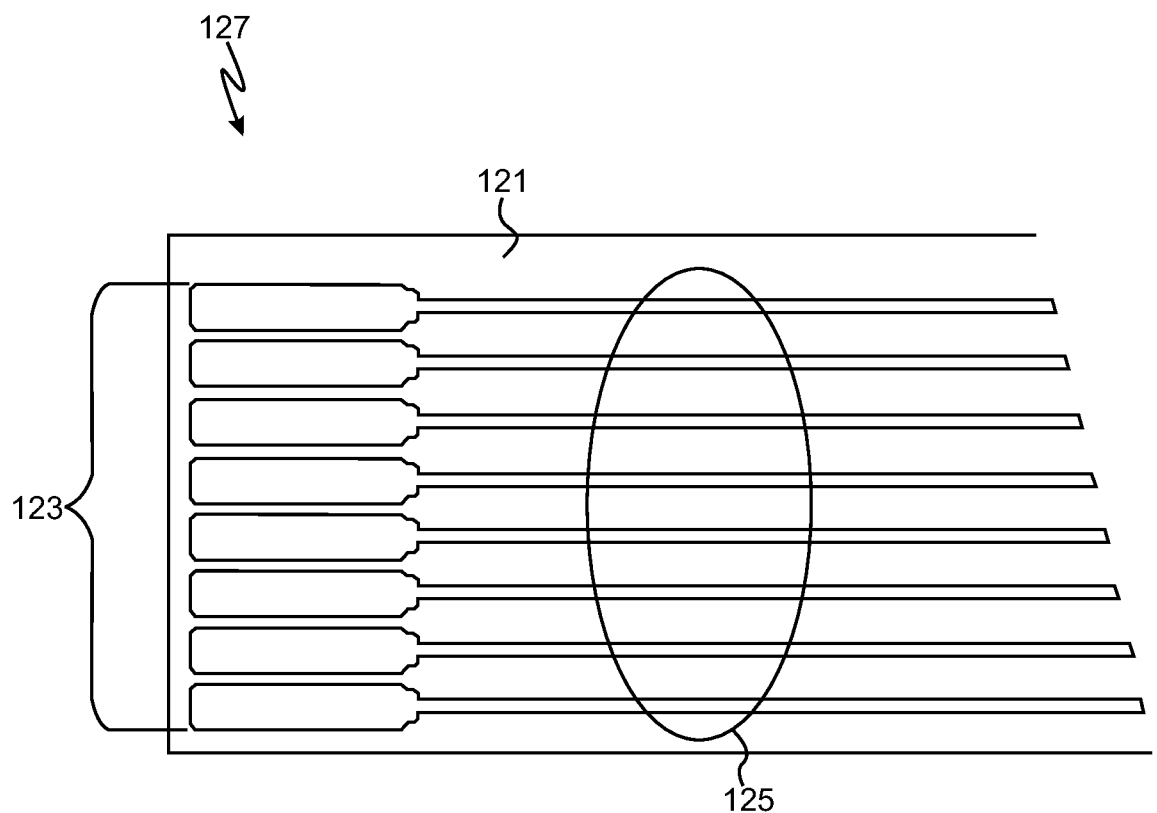
FIG. 6 shows a top view of a prior art flex circuit.

FIG. 6 shows one end of a flex circuit (or "flexible printed circuit") 127 configured for attachment to touchscreen 90 at one end, and to controller 100 or to an intervening circuit or printed circuit board at the other end (not shown in FIG. 6). Flex circuit 127 of FIG. 6 is shown prior to attachment to touchscreen 90. It similarly has a group of metal pads or terminals 123 along one edge, intended to align with pads or terminals 115 and 117 on touchscreen 90. Flex circuits are well known in the art, comprise a patterned arrangement of printed wiring utilizing flexible base material with or without flexible cover layers, and may be manufactured using a variety of materials such as DuPont® Kapton®. Flex circuits can be light, compact, and robust. Because they bend, however, flex circuits have specific needs different from those of traditional rigid circuits. Designers must consider materials, circuit architecture, placement of features, and the number of layers in the circuit during the design process. Other items of concern include the degree to which a flex circuit will bend, how tight the bend will be, how the bend will be formed, and how frequently the flex circuit in intended to flex.

Figure 7:
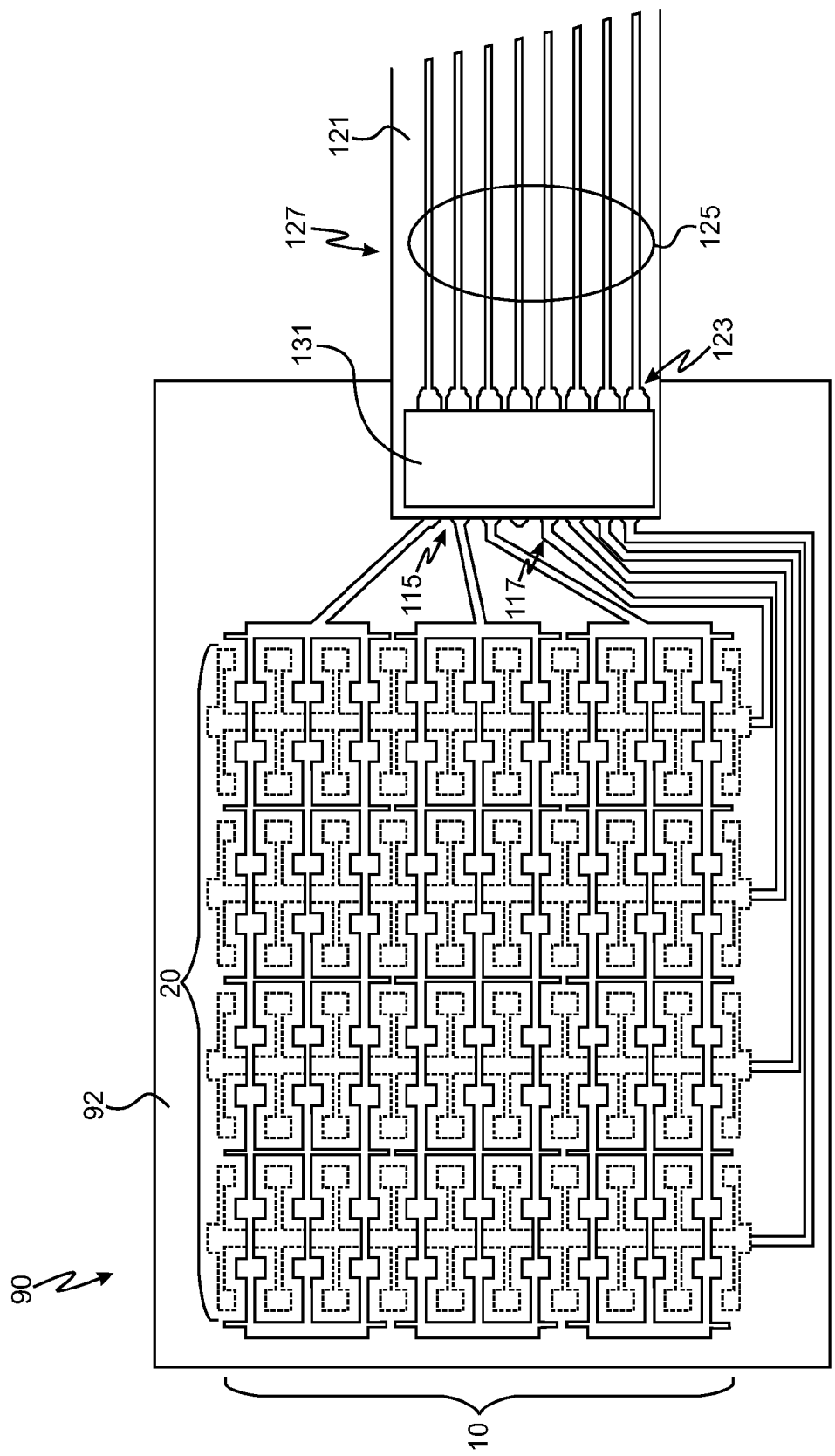
FIG. 7 shows a top view of a prior art touchscreen electrically connected to a flex circuit.

FIG. 7 shows the touchscreen 90 of FIG. 5 electrically connected to flex circuit 127 by means of a strip of anisotropic conductive film 131, which interconnects touchscreen 90 and flex circuit 127. Anisotropic conductive film 131 comprises collapsible metal shells embedded in an adhesive film. By applying heat and pressure, anisotropic conductive film 131 establishes a permanent connection path between aligned metal pads or terminals 115 and 117 on touchscreen 90 and flex circuit 127, as shown in FIGS. 7 and 8.

Figure 8:
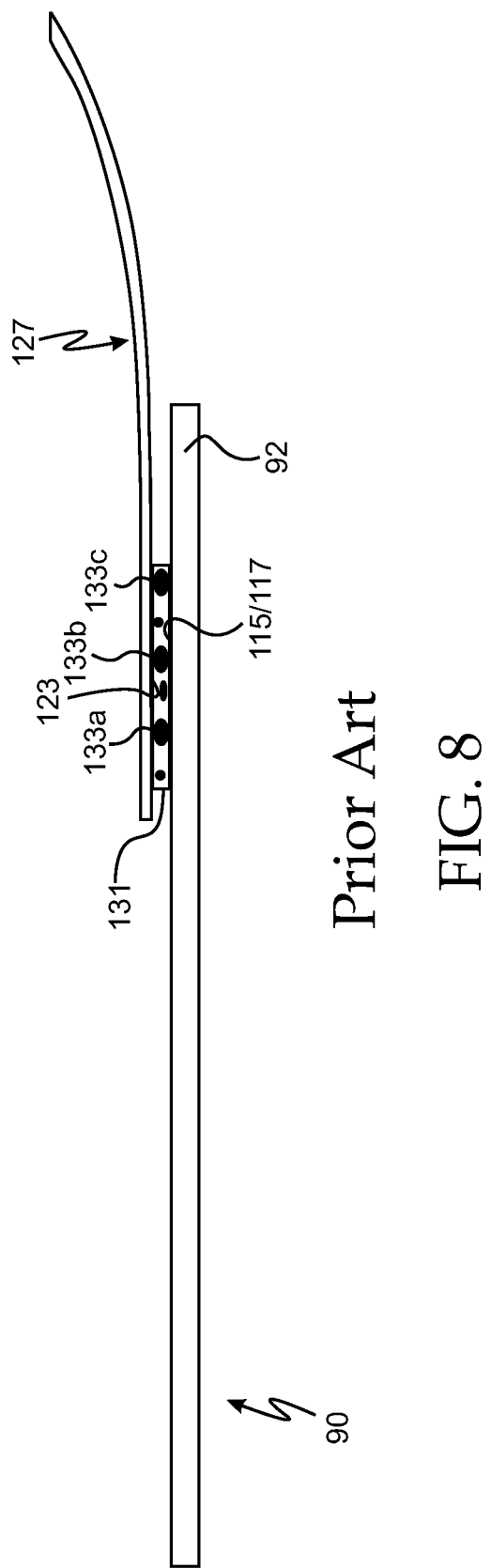
FIG. 8 shows a cross-sectional side view of the prior art touchscreen and flex circuit of FIG. 7.

FIG. 8 shows a side view of touchscreen 90 and flex circuit 127 in the plane of touchscreen 90. Collapsed spheres 133a, 133b and 133c in anisotropic conductive film 131 are exaggerated in scale in FIG. 8 for purposes of illustration. Adhesive in anisotropic conductive film 131 holds touchscreen 90 and flex circuit 127 together. As described above, touchscreen system 110 determines the location of finger contacts or touches based on the modification of fringing fields in mutual capacitance that occur between rows and columns or the drive and sense electrodes, where mutual capacitances are typically on the order of 1 pF.

Figure 9:
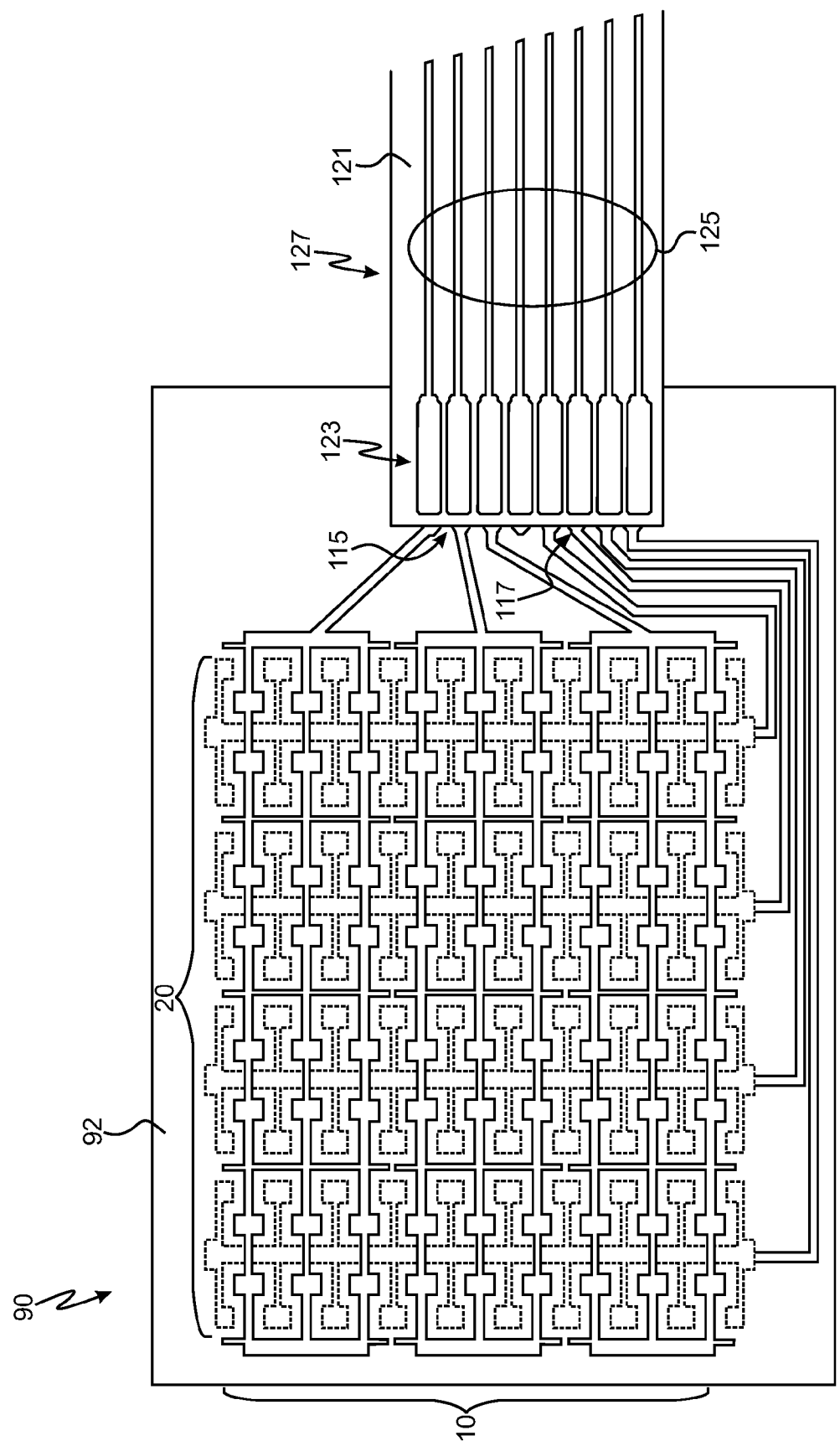
FIG. 9 shows a top view of one embodiment of a touchscreen capacitively coupled to a flex circuit.

Referring now to FIG. 9, there is shown one embodiment of touchscreen 90 and flex circuit 127, where capacitive touchscreen 90 comprises drive and sense touchscreen electrodes 10 and 20 that are operably connected at one end to corresponding touchscreen electrode terminals 115 and 117. When touchscreen 90 is being drive, mutual capacitances exist between the drive and sense electrodes at locations where the drive and sense electrodes intersect, the mutual capacitances changing in the presence of one or more fingers or touch devices brought into proximity thereto. Not shown in FIG. 9 is touchscreen controller 100, which is located to the right and disposed at the other end of flex circuit 127, or which may be mounted on or attached to a PCB or other substrate configured to provide electrical interconnections between flex circuit 127 and the terminals of controller 100. Controller 100 is configured to provide drive signals to, and to receive sense signals from, touchscreen 90 through the controller terminals and the flex circuit.

Continuing to refer to FIG. 9, flex circuit 127 comprises a plurality of flex circuit traces 125 disposed between first and second ends thereof. The first end (not shown in FIG. 9) comprises first terminals corresponding to each of the flex circuit traces, the first terminals being operably connected to corresponding ones of the controller terminals, either directly or through intervening electrical pathways disposed on another circuit or PCB. The second end of flex circuit 127 is shown FIG. 9, and has second terminals 123 positioned and aligned over the right-most end of touchscreen 90 and terminals or pads 115 and 117 thereof, where second terminals 123 correspond to each of flex circuit traces 125.

Figure 10:
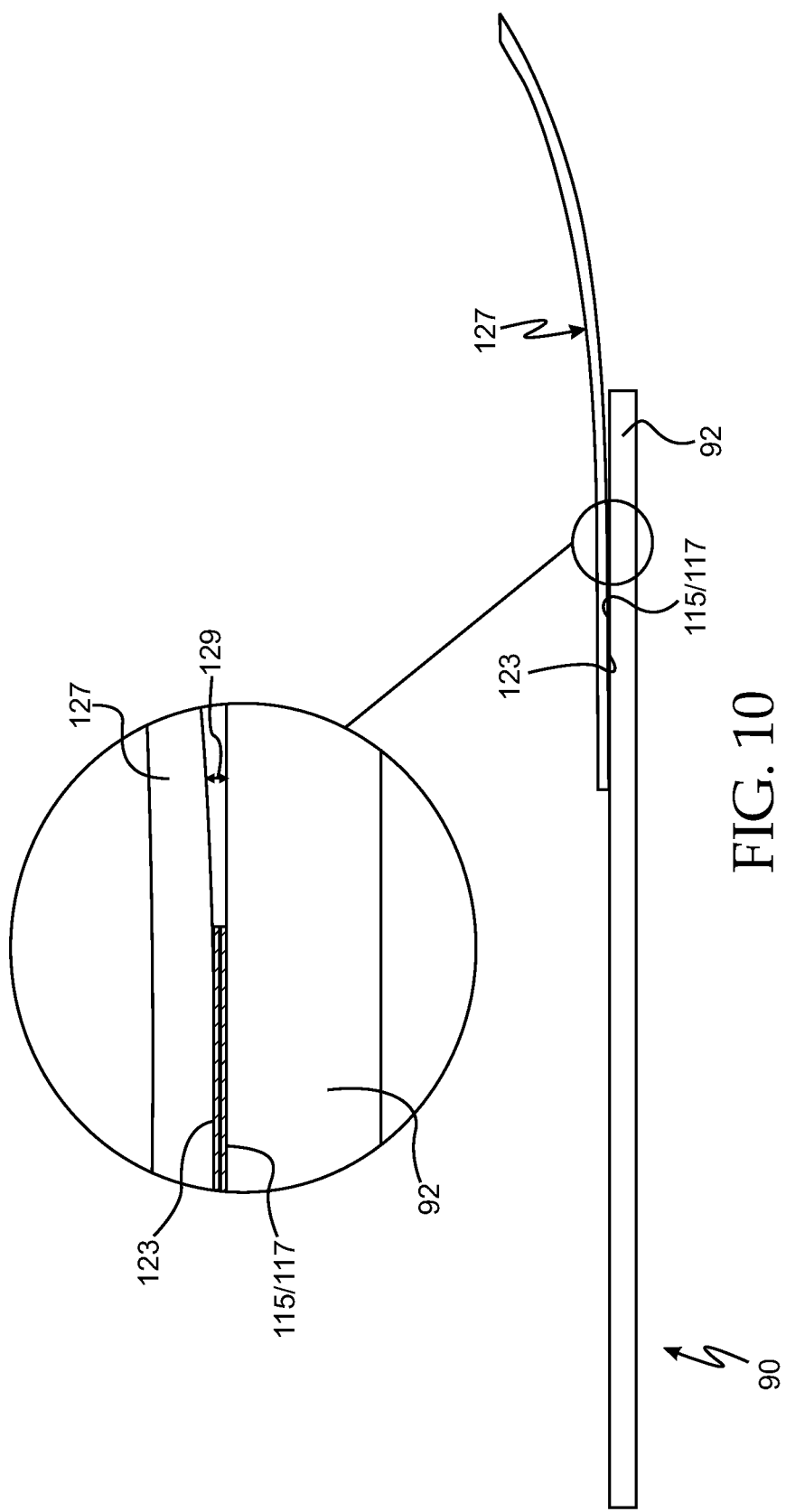
FIG. 10 shows a cross-sectional side view of the touchscreen and flex circuit of FIG. 9.

In FIG. 9, and as illustrated in greater detail in FIG. 10 (which is a side view of touchscreen 90 and the second end of flex circuit 127), second terminals 123 are spaced apart from, or in physical contact with, corresponding ones of touchscreen electrode terminals 115 and 117. Second terminals 123 are not soldered or otherwise physically attached to touchscreen electrode terminals 115 and 117, and are spaced apart from, or in physical contact with, touchscreen electrode terminals 115 and 117 by gaps 129 that can range between about 0.0 mm and about 1 mm. The range of gaps includes within its scope second terminals 123 and touchscreen electrode terminals 115 and 117 touching or being in physical contact with another. Note further that gaps 129 are sufficiently small to permit capacitive coupling of drive and sense signals provided by touchscreen electrode terminals 115 and 117 to second terminals 123.

Touchscreen 90 of FIGS. 9 and 10 is pressed into contact with flexible circuit 127. Even though direct metal-to-metal contact between second terminals 123 and touchscreen electrode terminals 115 and 117 may not be ensured, capacitive coupling between metal pads or terminals 115 and 117 of touchscreen 90 and second metal pads or terminals 123 of flex circuit 127 permits drive signals to be coupled to the drive rows (or columns) of touchscreen 90 without the use of by electrically conductive bonding agents or materials such as solder or anisotropic conductive film, and further permits sensing of the mutual capacitances between the drive and sense electrodes through to the sense columns (or rows) in touchscreen 90. While slight air gaps may intervene, or thin oxide layers may develop or be present, in gaps 129 between touchscreen 90 panel and flexible circuit 127, series capacitances are formed at the interfaces between metal pads or terminals 115 and 117 of touchscreen 90 and second metal pads or terminals 123 of flex circuit 127. By maintaining a small mechanical gap and/or physical contact, without the use of solder, collapsed metal capsules or other electrical connection bonding agents or materials, and optionally by using an appropriate non-electrically conductive adhesive between the metal pads or terminals 115 and 117 of touchscreen 90 and second metal pads or terminals 123 of flex circuit 127, and by choosing appropriate areas or sizes for the overlapping metal pads or terminals, series capacitances can kept large relative to the roughly 1 pF mutual capacitances such a system is intended to measure.

Figure 11:
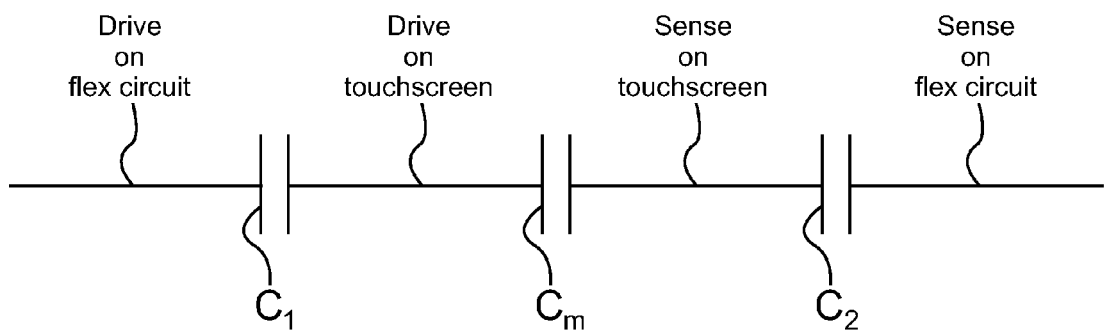
FIG. 11 shows an illustrative capacitance circuit for a touchscreen and flex circuit according to one embodiment.

The simplified and exemplary series capacitance circuit of FIG. 11 illustrates this concept in greater detail. In FIG. 11, the effective capacitance from the drive lines on the flexible circuit (and thus at capacitive touchscreen controller 100) is the series capacitance of $C_1$, $C_m$ and $C_2$, which may be expressed as $C_{total}=1/(1/C_1+1/C_m+1/C_2)$. The values of $C_1$ and $C_2$ can be approximated based on the classic parallel plate capacitance formula of $C=epsilon*A/d$, where epsilon is the permittivity of the material between the two pads or terminals, A is the area of the parallel pads or terminals, and d is the distance between the two pads or terminals. For example, if an air gap of less than 5 μm is employed, and the pads or terminals have areal dimensions of 2 mm by 10 mm, $C_1$ and $C_2$ will be approximately 8.584 pF/m*2e−3m*10e−3m/5e−6m=35.4 pF. In this case, $C_{total}=1/(1/35.4$ pF$+1/1$ pF$+1/35.4$ pF$)=0.95$ pF, which is nearly the same as the 1.0 pF obtained using traditional metal to metal contact and bonding through anisotropic conductive film or solder. Thus, with only a slight loss of signal amplitude, normal touch location operation can occur without the cost associated with procuring and hot-bar bonding anisotropic conductive film, or forming solder joints, between touchscreen 90 and flex circuit 127.

Figure 12:
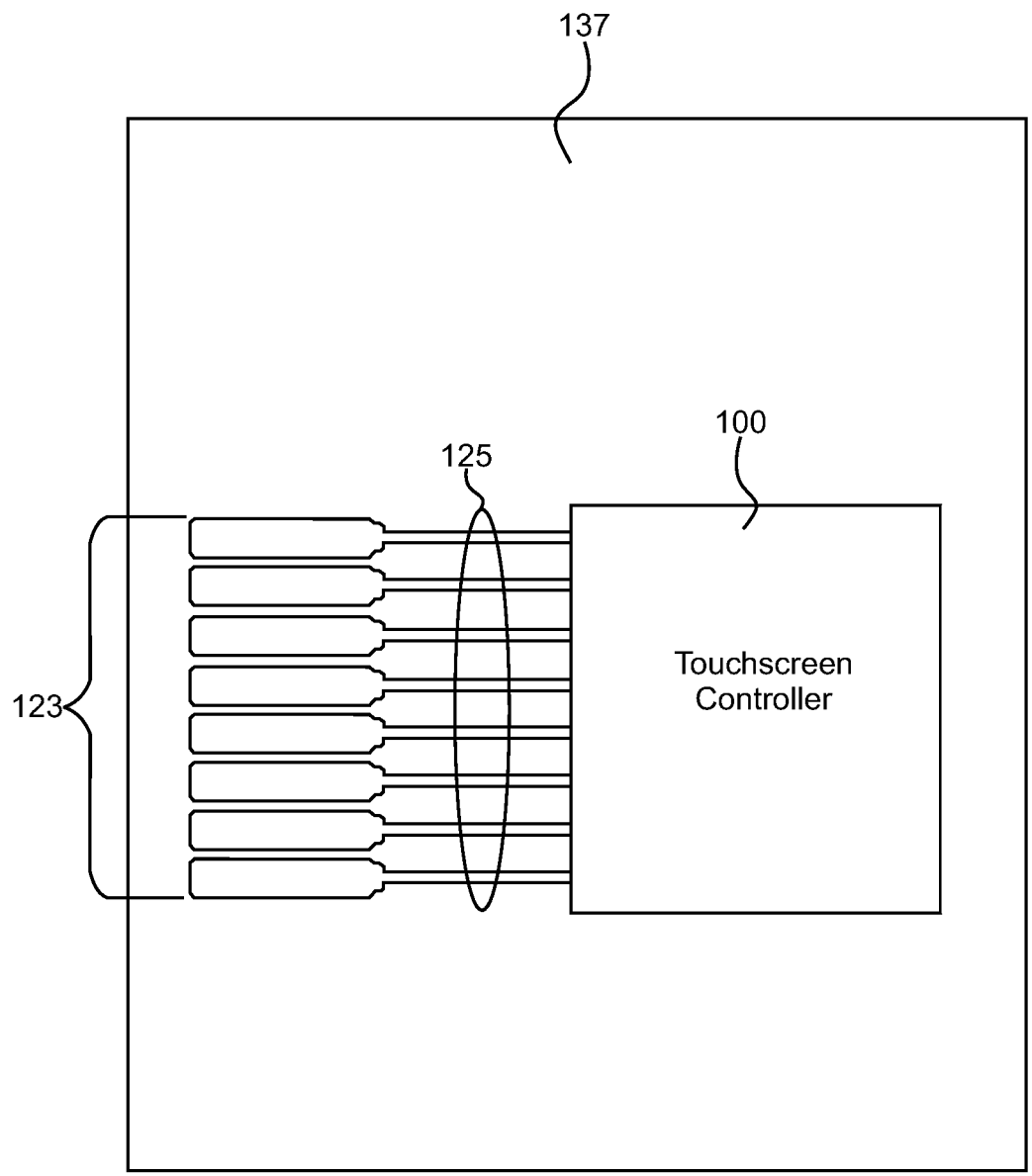
FIG. 12 shows a top view of a printed circuit board according to one embodiment.
Figure 13:
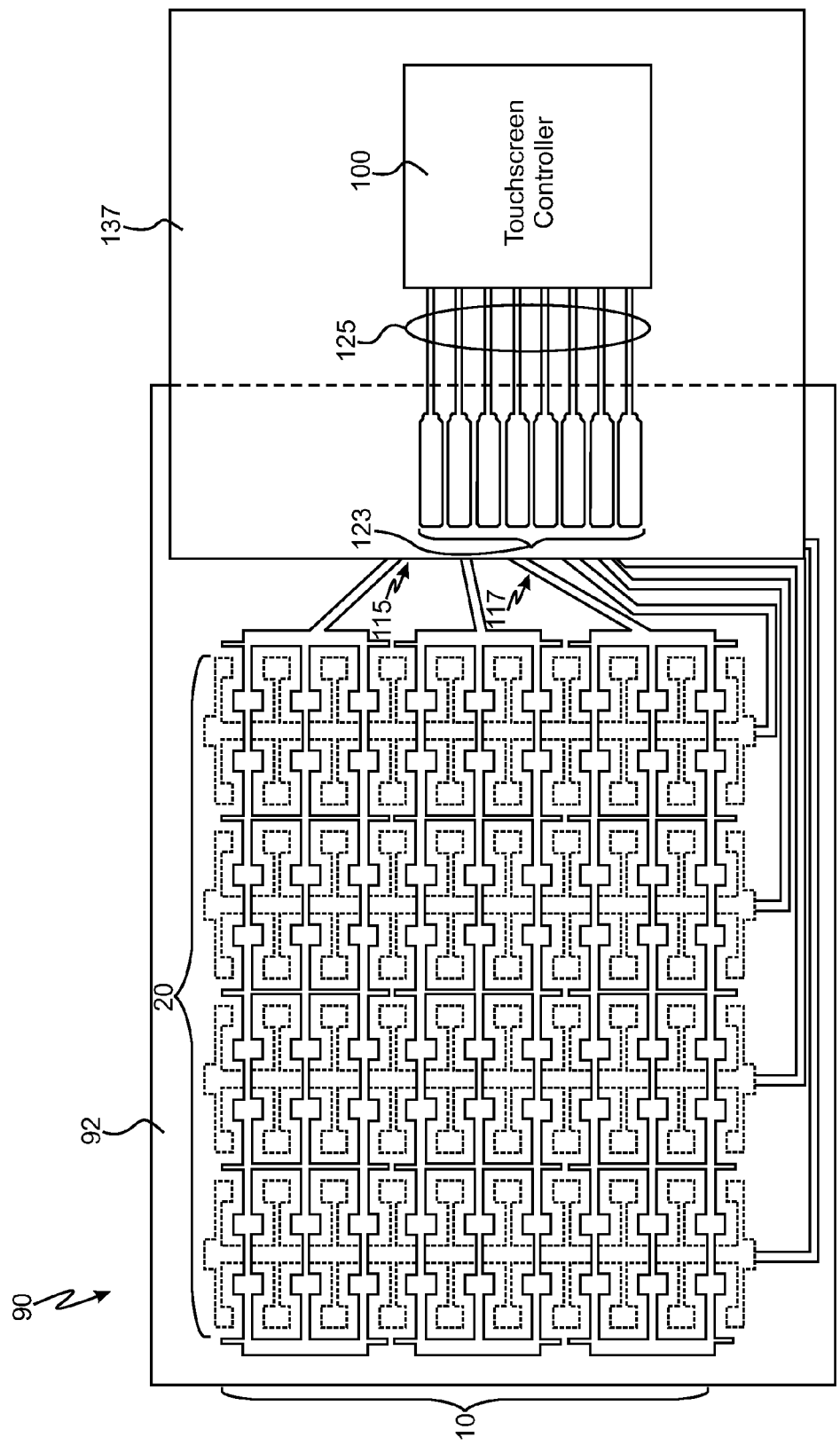
FIG. 13 shows a top view of one embodiment of a touchscreen capacitively coupled to the printed circuit board of FIG. 12.
Figure 14:
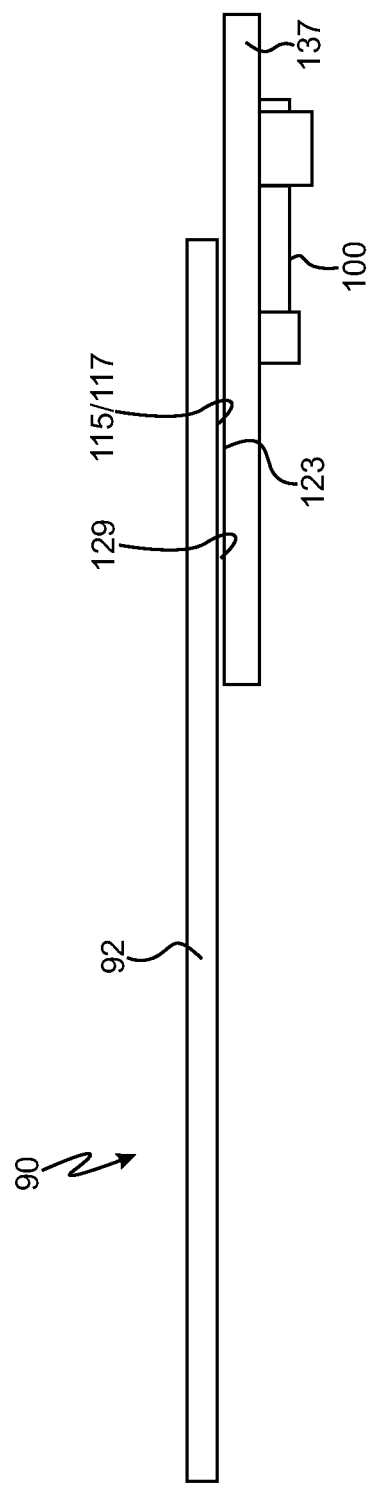
FIG. 14 shows a cross-sectional side view of the touchscreen and printed circuit board of FIG. 13.

FIGS. 12, 13 and 14 illustrate another embodiment where touchscreen controller 100 is mounted on printed circuit board, printed circuit or flexible circuit 137, and terminals 123 of printed circuit board, printed circuit or flexible circuit are brought into direct contact or into sufficiently close physical proximity to capacitive touchscreen terminals 115 and 117. In one such embodiment, printed circuit board, printed circuit or flexible circuit 137 is a PCB. In another such embodiment, printed circuit board, printed circuit or flexible circuit 137 is a flex (or flexible) circuit. In the embodiment shown in FIGS. 12, 13 and 14, printed circuit board, printed circuit or flexible circuit 137 is a rigid PCB where capacitive contact coupling is implemented between touchscreen 90 rigid PCB 137. FIG. 12 shows a top view of PCB 137, which as shown comprises second terminals 123, connecting traces 125 and touchscreen controller 100. FIG. 13 shows a top view of touchscreen 90 capacitively coupled to PCB 137 through second terminals 123 and capacitive touchscreen terminals 115 and 117. FIG. 14 shows a side view of. FIG. 13 shows a top view of touchscreen 90 capacitively coupled to PCB 137 through second terminals 123 and capacitive touchscreen terminals 115 and 117. Note that no anisotropic conductive film or solder is employed in gap 129. Instead, rigid PCB 137 is merely positioned against and/or slightly spaced apart from touchscreen 90. Moreover, second terminals 123 may comprise first pads having a first area and touchscreen electrode terminals 115 and/or 117 may comprise second pads having a second area, where the first area is greater than the second area. Alternatively, second terminals 123 may comprise first pads having a first area and touchscreen electrode terminals 115 and/or 117 may comprise second pads having a second area, where the second area is greater than the first area. Note that alignment requirements between the first pads and the second pads can be eased by making pads on one side larger in area than those corresponding to the opposite mating surface. In such a way, relatively constant capacitance and capacitive coupling can be maintained despite small lateral misalignments between the first and second pads.

In the various embodiments disclosed herein, the series capacitances associated with each of gaps 129 may exceed about 1 pF, about 10 pF, and/or about 30 pF. When the drive electrodes are driven, the mutual capacitances of touchscreen 90 may range between about 0.2 pF and about 1.5 pF, and/or between about 0.8 pF and about 1.2 pF.

Other embodiments include methods of capacitively coupling touchscreen electrode terminals 115 and 117 to second terminals of flex circuit 127 without physically bonding touchscreen electrode terminals 115 and 117 to the flex circuit terminals 123 using solder or anisotropic conductive film.

One such method comprises spacing flex circuit terminals 123 apart from, or placing flex circuit terminals 123 in physical contact with, corresponding ones of touchscreen electrode terminals 115 and 117. The method further comprises not soldering or otherwise physically attaching flex circuit terminals 123 to touchscreen electrode terminals 115 and 117, and positioning flex circuit terminals 123 with respect to touchscreen electrode terminals 115 and 117 such that flex circuit terminals 123 are spaced apart from, or in physical contact with, touchscreen electrode terminals 115 and 117 by gaps 129 ranging between about 0.0 mm and about 1 mm, gaps 129 being sufficiently small to permit capacitive coupling of drive and sense signals provided by touchscreen electrode terminals 115 and 117 to terminals 123.

Another such method comprises capacitively coupling touchscreen electrode terminals 115 and 117 to terminals 123 of printed circuit 137 without physically attaching touchscreen electrode terminals 115 and 117 to printed circuit terminals 123. The method further comprises spacing printed circuit terminals 123 apart from, or placing printed circuit terminals 123 in physical contact with, corresponding ones of touchscreen electrode terminals 115 and 117, not soldering or otherwise physically attaching printed circuit terminals 123 to touchscreen electrode terminals 123, and positioning printed circuit terminals 123 with respect to touchscreen electrode terminals 115 and 117 such that printed circuit terminals 123 are spaced apart from, or in physical contact with, touchscreen electrode terminals 115 and 117 by gaps 129 ranging between about 0.0 mm and about 1 mm, gaps 129 being sufficiently small to permit capacitive coupling of drive and sense signals provided by touchscreen electrode terminals 115 to printed circuit terminals 123.

Note further that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A capacitive touchscreen system, comprising:
 a capacitive touchscreen comprising drive and sense touchscreen electrodes operably connected at one end to corresponding touchscreen electrode terminals, mutual capacitances existing between the drive and sense electrodes at locations where the drive and sense electrodes intersect, such mutual capacitances changing in the presence of one or more fingers or touch devices brought into proximity thereto;
 a touchscreen controller comprising controller terminals, the controller being configured to provide drive signals and to receive sense signals through the controller terminals, and
 a flex circuit comprising a plurality of flex circuit traces disposed between a first end and a second end thereof, the first end comprising first terminals corresponding to each of the flex circuit traces, the first terminals being operably connected to corresponding ones of the controller terminals, the second end comprising second terminals corresponding to each of the flex circuit traces;
 wherein the second terminals are spaced apart from, or in physical contact with, corresponding ones of the touchscreen electrode terminals, the second terminals of the flex circuit are coupled to the touchscreen electrode terminals without use of an electrically conductive bonding agent or material, the touchscreen electrode terminals and the second terminals are metal pads, the second terminals are spaced apart from, or in physical contact with, the touchscreen electrode terminals by gaps ranging between about 0.0 mm and about 1 mm, and the gaps are sufficiently small to permit capacitive coupling of drive and sense signals provided by the touchscreen electrode terminals to the second terminals.

2. The capacitive touchscreen system of claim 1, wherein the touchscreen controller is mounted on or attached directly to the flex circuit and the controller terminals are electrically connected to corresponding ones of the first terminals.

3. The capacitive touchscreen system of claim 1, wherein the touchscreen is mounted on, attached to or forms a portion of a printed circuit.

4. The capacitive touchscreen system of claim 3, wherein the printed circuit is a printed circuit board.

5. The capacitive touchscreen system of claim 1, wherein a series capacitance associated with each of the gaps exceeds about 1 pF.

6. The capacitive touchscreen system of claim 1, wherein a series capacitance associated with each of the gaps exceeds about 10 pF.

7. The capacitive touchscreen system of claim 1, wherein a series capacitance associated with each of the gaps exceeds about 30 pF.

8. The capacitive touchscreen system of claim 1, wherein the mutual capacitances range between about 0.2 pF and about 1.5 pF.

9. The capacitive touchscreen system of claim 1, wherein the mutual capacitances range between about 0.8 pF and about 1.2 pF.

10. The capacitive touchscreen system of claim 1, wherein the second terminals comprise first pads having a first area and the touchscreen electrode terminals comprise second pads having a second area, the first area being greater than the second area.

11. The capacitive touchscreen system of claim 1, wherein the second terminals comprise first pads having a first area and the touchscreen electrode terminals comprise second pads having a second area, the second area being greater than the first area.

12. A capacitive touchscreen system, comprising:
a capacitive touchscreen comprising drive and sense touchscreen electrodes operably connected at one end to corresponding touchscreen electrode terminals, mutual capacitances existing between the drive and sense electrodes at locations where the drive and sense electrodes intersect, such mutual capacitances changing in the presence of one or more fingers or touch devices brought into proximity thereto;
a touchscreen controller comprising controller terminals, the controller being configured to provide drive signals and to receive sense signals through the controller terminals;
a printed circuit comprising printed circuit traces operably connected at one end to corresponding ones of the controller terminals and at the other end to printed circuit terminals;
wherein the touchscreen controller is mounted on the printed circuit, the printed circuit terminals are spaced apart from, or in physical contact with, corresponding ones of the touchscreen electrode terminals, the printed circuit terminals are coupled to the touchscreen electrode terminals without use of an electrically conductive bonding agent or material, the touchscreen electrode terminals and the printed circuit terminals are metal pads, the printed circuit terminals are spaced apart from, or in physical contact with, the touchscreen electrode terminals by gaps ranging between about 0.0 mm and about 1 mm, and the gaps are sufficiently small to permit capacitive coupling of drive and sense signals provided by the touchscreen electrode terminals to the printed circuit terminals.

13. The capacitive touchscreen system of claim 12, wherein the touchscreen is mounted on, attached to or forms a portion of a touchscreen printed circuit.

14. The capacitive touchscreen system of claim 12, wherein the printed circuit is a printed circuit board.

15. The capacitive touchscreen system of claim 12, wherein a series capacitance associated with each of the gaps exceeds about 1 pF.

16. The capacitive touchscreen system of claim 12, wherein a series capacitance associated with each of the gaps exceeds about 10 pF.

17. The capacitive touchscreen system of claim 12, wherein a series capacitance associated with each of the gaps exceeds about 30 pF.

18. The capacitive touchscreen system of claim 12, wherein the mutual capacitances range between about 0.2 pF and about 1.5 pF.

19. The capacitive touchscreen system of claim 12, wherein the mutual capacitances range between about 0.8 pF and about 1.2 pF.

20. The capacitive touchscreen system of claim 12, wherein the printed circuit terminals comprise first pads having a first area and, the touchscreen electrode terminals comprise second pads having a second area, the first area being greater than the second area.

21. The capacitive touchscreen system of claim 12, wherein the printed circuit terminals comprise first pads having a first area and the touchscreen electrode terminals comprise second pads having a second area, the second area being greater than the first area.

22. A method of capacitively coupling touchscreen electrode terminals to terminals of a flex circuit without physically attaching the touchscreen electrode terminals to the flex circuit terminals, the method comprising: spacing the flex circuit terminals apart from, or placing the flex circuit terminals in physical contact with, corresponding ones of the touchscreen electrode terminals, coupling the flex circuit terminals to the touchscreen electrode terminals without use of electrically conductive bonding agent or material, the touchscreen electrode terminals and the flex circuit terminal are metal pads, and positioning the flex circuit terminals with respect to the touchscreen electrode terminals such that the flex circuit terminals are spaced apart from, or in physical contact with, the touchscreen electrode terminals by gaps ranging between about 0.0 mm and about 1 mm, the gaps being sufficiently small to permit capacitive coupling of drive and sense signals provided by the touchscreen electrode terminals to the flex circuit terminals.

23. The method of claim 22, wherein a series capacitance associated with each of the gaps exceeds about 10 pF.

24. The method of claim 22, wherein a series capacitance associated with each of the gaps exceeds about 30 pF.

25. The method of claim 22, wherein the flex circuit terminals comprise first pads having a first area and the touchscreen electrode terminals comprise second pads having a second area, the first area being greater than the second area.

26. The method of claim 22, wherein the flex circuit terminals comprise first pads having a first area and the touchscreen electrode terminals comprise second pads having a second area, the second area being greater than the first area.

27. The method of claim 22, further comprising operably connecting controller terminals to the flex circuit.

28. A method of capacitively coupling touchscreen electrode terminals to terminals of a printed circuit without physically attaching the touchscreen electrode terminals to the printed circuit terminals, the method comprising: spacing the printed circuit terminals apart from, or placing the printed circuit terminals in physical contact with, corresponding ones of the touchscreen electrode terminals, coupling the printed circuit terminals to the touchscreen electrode terminals without use of an electrically conductive bonding agent or material, the touchscreen electrode terminals and the printed circuit terminals are metal pads, and positioning the printed circuit terminals with respect to the touchscreen electrode terminals such that the printed circuit terminals are spaced apart from, or in physical contact with, the touchscreen electrode terminals by gaps ranging between about 0.0 mm and about 1 mm, the gaps being sufficiently small to permit capacitive coupling of drive and sense signals provided by the touchscreen electrode terminals to the printed circuit terminals.

29. The method of claim 28, wherein the printed circuit is a printed circuit board.

30. The method of claim 28, wherein a series capacitance associated with each of the gaps exceeds about 10 pF.

31. The method of claim 28, wherein a series capacitance associated with each of the gaps exceeds about 30 pF.

32. The method of claim 28, wherein the printed circuit terminals comprise first pads having a first area and the touchscreen electrode terminals comprise second pads having a second area, the first area being greater than the second area.

33. The method of claim 28, wherein the printed circuit terminals comprise first pads having a first area and the touchscreen electrode terminals comprise second pads having a second area, the second area being greater than the first area.

34. The method of claim 28, further comprising operably connecting controller terminals to the printed circuit.

* * * * *